FREQUENCY DEPENDENT GATING CIRCUIT ARRANGEMENT

Filed Feb. 2, 1967

INVENTOR.
KEITH H. WILLIAMSON
BY
Frank R. [signature]
AGENT

United States Patent Office 3,508,074

Patented Apr. 21, 1970

3,508,074
FREQUENCY DEPENDENT GATING CIRCUIT ARRANGEMENT

Keith Harold Williamson, Fetcham, England, assignor, by mesne assignments, to U.S. Philips Corporation, New York, N.Y., a corporation of Delaware Filed Feb. 2, 1967, Ser. No. 613,621
Claims priority, application Great Britain, Feb. 2, 1966, 4,416/66
Int. Cl. H03k *17/60*
U.S. Cl. 307—233 7 Claims

ABSTRACT OF THE DISCLOSURE

The following disclosure describes a circuit for connecting an input pulsating signal to an output voltage having an amplitude dependent upon the pulse frequency. The input pulses activate a monostable multivibrator for charging a first capacitor, and a gate activated by the input pulse signal transfers the charge to a second capacitor. The charge on the second capacitor can be employed to control an M.O.S.T.

This invention relates to a circuit arrangement for controlling a quantity such as a current in accordance with the frequency of a pulse train.

The quantity itself may not be the factor which is to be ultimately controlled but it may be one step in a process of control. For example it may be required to control a voltage in a feed back loop of a motor control system such as is described in the copending application Ser. No. 613,667, filed Feb. 2, 1967 and now abandoned. In this application the voltage controls the conduction of an emitter follower and is derived from a circuit similar to that to be described in the following specific example.

The circuit arrangement according to the present invention is characterized in that, the pulses of the train or pulses derived therefrom are arranged to charge a first capacitor to a predetermined level and the charge on this capacitor is arranged to decay very nearly linearly between successive pulses, a second capacitor is arranged to be charged to a level equivalent to the level to which the charge on the first capacitor has discharged at the beginning of a second pulse and the voltage level is arranged to be isolated between pulses from the first capacitor and to apply its voltage to a control electrode of a controllable element to regulate a current flowing through the said element.

The second capacitor is preferably isolated from the first capacitor by a switching element such as a transistor which is only conducting for a short period such as the duration of a single pulse. The controllable element should have a high impedance and is preferably an insulated gate field effect transistor such as a M.O.S.T. In such a case the control electrode is the gate electrode of the M.O.S.T.

The input pulses of the train of pulses may be applied to a monostable circuit which converts these pulses to pulses of a constant width which are applied to the said first capacitor.

Figure 1:
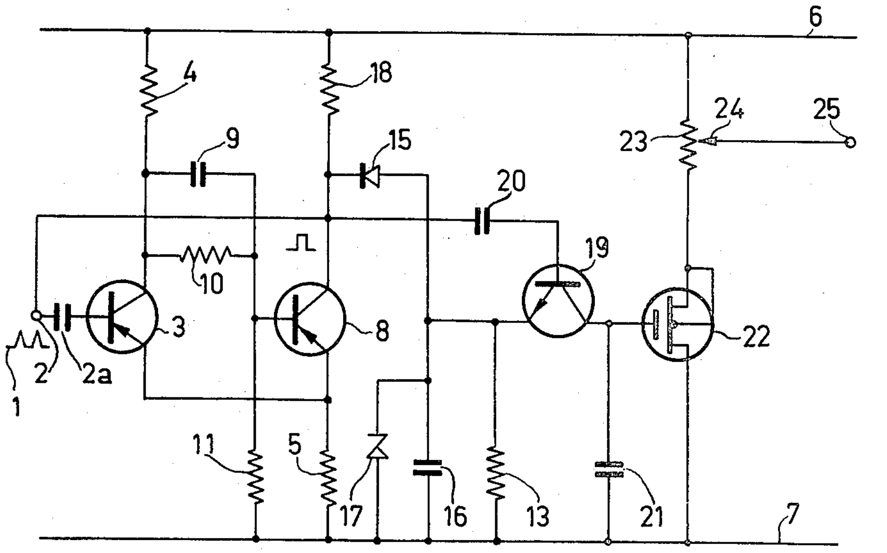
Figure 2:
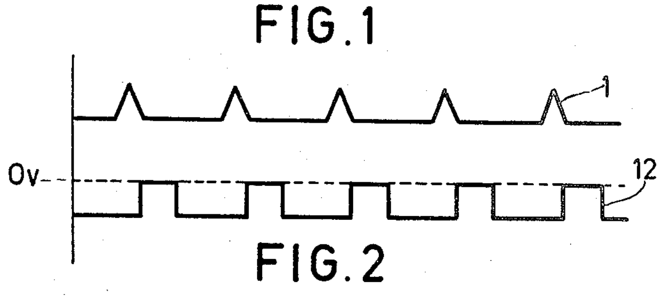
Figure 3:
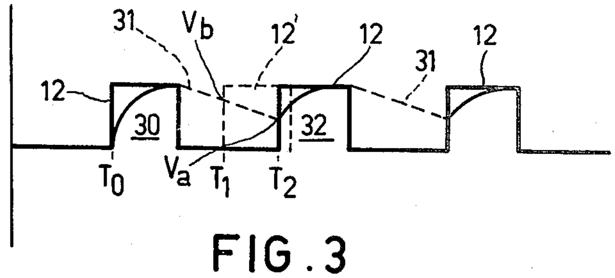

One example of a circuit arrangement in accordance with the present invention will now be described with reference to the three figures of the accompanying drawings in which FIGURE 1 shows one embodiment of a circuit arrangement according to the invention and FIGURES 2 and 3 show current time diagrams for explaining the action of the circuit of FIGURE 1.

Referring now to FIGURE 1 of the accompanying drawings a train of needle pulses 1 is arranged to be applied via capacitor 2A to an input terminal 2 connected to the base of a transistor 3. The emitter-collector path of the transistor 3 is connected via resistors 4 and 5 between a zero voltage line 6 and a positive line 7 which is in this example at a potential of about 14 v. The collector of the transistor 3 is also coupled to the base of a transistor 8 via a R.C. circuit comprising a capacitor 9 and a resistor 10 arranged in parallel. The base of the transistor 8 is also connected via resistor 11 to the rail 7. The output of the transistor 8 is taken from the collector of that transistor via a diode 15 to a capacitor 16. The capacitor 16 is shunted by a Zener diode 17 and the collector of the transistor 8 is also connected to the rail 6 by a further resistor 18.

A switching transistor 19 has its base electrode connected via capacitor 20, to the collector of transistor 8 so that this transistor acts as a control for transistor 19. The emitter of transistor 19 is connected to the capacitor 16 at its junction with the diode 15 and its collector is connected to a capacitor 21 which is also connected to the rail 7. The collector of the transistor 19 is also connected to the gate electrode of a metal oxide silicon transistor 22. The drain and source of transistor 22 are connected respectively to the rail 7 and to the rail 6 via resistor 23. The substrate of the transistor 22 is strapped to the source electrode as shown. The current flowing in the drain to source path is tapped off at the point 24 and fed to an output terminal 25.

In operation the pulses 1 which are shown as needle pulses in FIGURE 2 are fed from a suitable source such as an oscillator to the terminal (FIG. 2) and control the conduction of the transistor 3. This transistor together with the transistor 8 and the R.C. circuit act as a monostable circuit to convert these needle pulses into pulses 12 (2) of a constant width and a constant height. The time relationship of the needle pulses 1 and the square pulses 12 is illustrated in FIGURE 2. The square pulses 12 thus appear at the collector of the transistor and are applied through the diode 15 to the capacitor 16 which discharges substantially linearly through resistor 13. The capacitor 16 then charges during the period of the first pulse 12 in accordance with the waveform indicated at 30 in FIGURE 3. It will be seen that the capacitor reaches its maximum charge at the end of the constant pulse width 12. During the interval T2 between the first pulse 12 and the second pulse 12 the charge on the capacitor 16 decays almost linearly because resistance of the resistor 13 is high and this is indicated by the dotted line 31 in FIGURE 3. When the second pulse 12 occurs the capacitor is recharged following the voltage curve 32 so that at the end of the second pulse 12 it is again fully charged.

It will be noted that the transistor 19 also receives pulses 1 at its base so that for the leading edge part of the pulse 1 transistor 19 is rendered conducting. At the moment when the transistor 19 becomes conducting the capacitor 21 acquires the charge which exists at that moment on the capacitor 16 and this is shown in FIGURE 3 as a voltage V*a*. When the transistor 19 cuts off by virtue of the action of the capacitor 20 during the period of the pulse 1 the capacitor 21 retains its charge since it is isolated from any discharge path. The capacitor 16 is then recharged during the whole period of the pulse 12.

Since the transistor 22 is a high impedance transistor no particular leakage will occur from the capacitor 21 from this transistor. However, the voltage existing on the capacitor 21 will be applied to the gate electrode of the transistor 22 and this will permit a related current to flow through the transistor 22. This current will be conducted at the terminal 25.

As long as the frequency of the pulse train 1 is constant the charge on the capacitor 21 will remain constant and thus the current through the transistor 22 will be unaltered. However, as soon as the frequency of the train of pulses 1 applied to a terminal 2 alters then the current from transistor 22 will be changed.

This change comes about in the following manner. Since the frequency of the pulses 12 is related to the frequency of the pulses 1 directly the pulses 12 will if the frequency of the pulses 1 is increased occur more rapidly so that the amount by which the charge on the capacitor 16 decays between successive pulses is less than previously. This is shown by the dotted waveform 12'—in FIG. 3 which shows the pulses occurring at an instant T1 instead of an instant T2 after the first pulses shown which start at the instant T0. Because of the advanced instant T1 the charge on the capacitor 16 will be of a higher value V*b* than the existing charge V*o* from the previous pulses on capacitor 21 and when transistor 19 becomes conducting during pulses 1—the capacitor 21 will charge to this higher value V*b*. Since the voltage of the capacitor 21 is now higher the voltage at the gate electrode of the transistor 22 is correspondingly higher and the current flow through the transistor is increased due to the transistor action. This increased current is detected at the output terminal 25.

It will thus be seen that the circuit arrangement is able to respond within one cycle of the input sequence to any change of frequency to give a corresponding alteration in the current. As long as the frequency is constant the corresponding current will be constant and any variation in frequency will be followed faithfully by variation in the current outcome.

What is claimed is:

1. A device for generating an output signal as a function of the frequency of an input pulse train comprising, a first means for storing energy, first means for charging said first energy storage means to a predetermined potential independent of the potential of said pulse train upon the occurrence of each of the pulses of said pulse train, means for discharging said first storage means substantially linearly with respect to time during the intervals between pulses, a second means for storing energy, second means for charging said second energy storage means to the potential of said first energy storage means at the beginning of a successive pulse of said pulse train comprising means for coupling said first and second storage means together at the beginning of the occurrence of each of said pulses of said pulse train, and means for measuring the potential of said second energy storage means.

2. A device as claimed in claim 1 wherein each of the storage means comprises a capacitor.

3. A device as claimed in claim 1 wherein said means for measuring potential comprises a controlled source having a control electrode coupled to said second energy storage means.

4. A device as claimed in claim 3 wherein the controlled source comprises an insulated gate field effect transistor, the gate electrode of which serves as said control electrode.

5. A device as claimed in claim 1 wherein the coupling means comprises a transistor.

6. A device as claimed in claim 1 wherein the second charging means requires for charging the occurrence of only a single successive pulse.

7. A device as claimed in claim 1 wherein said first charging means comprises a monostable circuit to which the train of pulses is applied and which converts said pulses into pulses of a constant width which are applied to the said first storage means.

References Cited

UNITED STATES PATENTS

| | | | |
|---|---|---|---|
| 3,058,012 | 10/1962 | Harling | 307—225 |
| 3,411,018 | 11/1968 | Dapper et al. | 307—246 |

JOHN S. HEYMAN, Primary Examiner

B. P. DAVIS, Assistant Examiner

U.S. Cl. X.R.

307—246, 304